(12) United States Patent
Kim (10) Patent No.: US 8,819,575 B2
(45) Date of Patent: Aug. 26, 2014

(54) METHOD AND APPARATUS THAT DISPLAY ITEMS ACCORDING TO A USER GESTURE

(75) Inventor: Jin Yong Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 304 days.

(21) Appl. No.: 13/189,870

(22) Filed: Jul. 25, 2011

(65) Prior Publication Data

US 2012/0060111 A1    Mar. 8, 2012

(30) Foreign Application Priority Data

Sep. 2, 2010   (KR) ........................ 10-2010-0086027

(51) Int. Cl.
*G06F 3/048*     (2013.01)
*G06F 3/033*     (2013.01)

(52) U.S. Cl.
USPC ........... 715/777; 715/767; 715/784; 715/810; 715/863

(58) Field of Classification Search
None
See application file for complete search history.

(56) References Cited

U.S. PATENT DOCUMENTS

| 5,745,716 | A  | * | 4/1998  | Tchao et al. .................. 715/777 |
| 6,248,946 | B1 | * | 6/2001  | Dwek ............................. 84/609 |
| 6,310,634 | B1 | * | 10/2001 | Bodnar et al. ................ 715/854 |
| 7,313,805 | B1 | * | 12/2007 | Rosin et al. ..................... 725/45 |
| 7,412,660 | B2 | * | 8/2008  | Donalson ....................... 715/777 |
| 7,574,669 | B1 |   | 8/2009  | Braun et al. .................. 715/777 |
| 7,587,679 | B1 |   | 9/2009  | Sundermeyer et al. |
| 2005/0005246 | A1 | * | 1/2005  | Card et al. ..................... 715/776 |
| 2005/0183030 | A1 | * | 8/2005  | Bertram et al. .............. 715/800 |
| 2006/0020970 | A1 | * | 1/2006  | Utsuki et al. .................... 725/39 |
| 2007/0150830 | A1 | * | 6/2007  | Ording et al. ................. 715/784 |
| 2007/0186175 | A1 |   | 8/2007  | Hudson, Jr. |
| 2007/0198947 | A1 |   | 8/2007  | Cox et al. |
| 2007/0288864 | A1 |   | 12/2007 | Keereepart et al. |
| 2008/0168349 | A1 | * | 7/2008  | Lamiraux et al. ............. 715/702 |
| 2008/0189645 | A1 | * | 8/2008  | Kapanen et al. .............. 715/777 |
| 2009/0013285 | A1 | * | 1/2009  | Blyth et al. ................... 715/816 |
| 2010/0058216 | A1 |   | 3/2010  | Yoon et al. |
| 2010/0169772 | A1 | * | 7/2010  | Stallings et al. .............. 715/702 |
| 2012/0036428 | A1 | * | 2/2012  | Tsuda et al. .................. 715/252 |

FOREIGN PATENT DOCUMENTS

JP           4123382      7/2008         G06F 3/048

* cited by examiner

*Primary Examiner* — Stephen Alvesteffer (74) *Attorney, Agent, or Firm* — Cha & Reiter, LLC (57) ABSTRACT

An item display method and apparatus that provides an easier and faster way to locate a desired item on a display. The method and apparatus receive a user gesture on display screen, and display one or both of items of a first category and items of a second category according to the user gesture. Items of the first category and items of the second category are displayed in various ways according to associated user gestures.

3 Claims, 11 Drawing Sheets

METHOD AND APPARATUS THAT DISPLAY ITEMS ACCORDING TO A USER GESTURE

CLAIM OF PRIORITY

This application claims priority under 35 U.S.C. §119 from Korean Patent Application KPA No.: 10-2010-0086027 filed Sep. 2, 2010, the contents of which are incorporated by reference herein in its entirety.

BACKGROUND OF THE INVENTION

1. Field of the Invention

The present invention relates to an item display method and apparatus. More particularly, the present invention relates to a method and apparatus that display items according to a user gesture.

2. Description of the Related Art

For playback of pre-stored digital content such as songs, images, games, broadcasts or moving images, an item display apparatus typically displays a list of items on the screen representing digital content. Such an item display apparatus may provide various input schemes adapted to enable the user to easily locate and select a desired item.

When a large amount of content is present, the item display apparatus may divide and even sub-divide many items into several categories for easier item management. The item display apparatus may provide a tree-type user interface, through which the user may traverse categories of items. Using the tree-type user interface, the user may search the categories for an item to be executed in a hierarchical manner. However, in devices such as mobile terminals having a small screen, as the number of categories and the layers thereof increase, users may have to frequently make screen transitions to access a desired item.

SUMMARY OF THE INVENTION

The present invention provides a method and apparatus that display one or both of first category items and second category items according to a user gesture to enable faster category traversal and item search than known heretofore.

In accordance with an exemplary embodiment of the present invention, there is provided an item display method preferably including: displaying items of a first category, a tab associated with the first category and a tab associated with a second category on the screen; receiving a user gesture on the screen; and displaying, when the user gesture is a selection gesture selecting one of the tab associated with the first category and the tab associated with the second category, one of items of the first category and items of the second category, and displaying, when the user gesture is a scroll gesture, both items of the first category and items of the second category.

Displaying both items of the first category and items of the second category may include, for example, scrolling through both items of the first category and items of the second category in the direction of the scroll gesture.

Displaying both items of the first category and items of the second category may include, for example, displaying items of the second category immediately after displaying the last item of the first category.

The method may further include selecting, when the user gesture is a scroll gesture, a second category on the basis of rankings of individual categories.

Displaying both items of the first category and items of the second category may include, for example, displaying items of the first category and items of the second category in different regions on the screen.

The selection gesture may, for example, correspond to a tap on the tab associated with the first category or to a tap on the tab associated with the second category.

The scroll gesture may, for example, correspond to a scroll action, a flick action, a drag action, or a swipe action.

The method may further include, for example, displaying the tab associated with the second category when the tab is hidden.

The method may further include, for example, reducing the tab associated with the first category when the tab associated with the second category is displayed.

The tab associated with the second category may be placed above or below the tab associated with the first category.

The method may further include, for example, making an indication, indicating the position of a particular one of the displayed items of the first category within the first category, on the tab associated with the first category.

In accordance with another exemplary embodiment of the present invention, there is provided an item display method preferably including: obtaining information regarding items of a first category and information regarding items of a second category; determining the sizes of the tabs associated with the first and second categories on the basis of the obtained information; and displaying the tabs associated with the first and second categories according to the determined sizes.

In determining the sizes of the tabs, the size of the tab associated with the second category is reduced when the size of the tab associated with the first category is increased.

The information regarding items may include the number of items.

The method may further include, for example, receiving a user gesture on the screen; and displaying, when the user gesture is a selection gesture selecting one of the tab associated with the first category and the tab associated with the second category, one of items of the first category and items of the second category, and displaying, when the user gesture is a scroll gesture, both items of the first category and items of the second category.

In accordance with another exemplary embodiment of the present invention, there is provided an item display method including: displaying items of a first category and a tab associated with the first category on the screen; receiving a user gesture for selecting at least one item of the first category; and displaying information regarding the selected item on the tab associated with the first category.

The information regarding the selected item may include, for example, at least one of position information of the selected item within the first category and a thumbnail of the selected item.

The user gesture may preferably begin at a region in which the item of the first category is displayed and ends at a region in which the tab associated with the first category is displayed.

The method may further include, for example, receiving a user gesture for selecting item information on the tab associated with the first category, and displaying additional information related to the selected item information.

The method may further include, for example, displaying, when information elements of multiple items are present on the tab associated with the first category, additional information related to at least one of the multiple items on the basis of the distance between information elements.

The method may further include displaying the selected item of the first category.

In accordance with another exemplary embodiment of the present invention, there is provided an item display apparatus preferably including: a display unit displaying a tab associated with a first category and a tab associated with a second category on the screen; an input unit receiving a user gesture through the display unit displaying items of the first category; and a processor/microprocessor/controller for controlling an operation of the display, when the user gesture is a selection gesture selecting one of the tab associated with the first category and the tab associated with the second category, one of items of the first category and items of the second category, and displaying, when the user gesture is a scroll gesture, both items of the first category and items of the second category.

The selection gesture may, for example, correspond to a click on the tab associated with the first category or to a click on the tab associated with the second category. Or repetitive clicks on the same tab within a predetermined time frame could indicate selection of a second category.

The tab associated with the second category may be placed, for example, above or below the tab associated with the first category.

The processor selects, when the user gesture is a scroll gesture, a second category on the basis of rankings of individual categories and displays both items of the first category and items of the second category.

In accordance with another exemplary embodiment of the present invention, there is provided an item display apparatus preferably including: a display unit displaying a tab associated with a first category and a tab associated with a second category on the screen; an input unit receiving a user gesture through the display unit; and a processor controlling an operation of obtaining information regarding items of the first category and information regarding items of the second category, determining the sizes of the tabs associated with the first and second categories on the basis of the obtained information, and displaying the tabs associated with the first and second categories according to the determined sizes.

The processor may reduce the size of the tab associated with the second category when the size of the tab associated with the first category is increased. The information regarding items may include the number of items.

In accordance with another exemplary embodiment of the present invention, there is provided an item display apparatus preferably including: a display unit displaying items of a first category and a tab associated with the first category; an input unit receiving a user gesture for selecting at least one item of the first category through the display unit; and a processor/controller for controlling an operation of processing information regarding the selected item and displaying the processed information on the tab associated with the first category.

The information regarding the selected item may preferably include at least one of position information of the selected item within the first category and a thumbnail of the selected item.

The processor may display the selected item of the first category.

In accordance with another exemplary embodiment of the present invention, there is provided an item display user interface preferably including: items of a first category, a tab associated with the first category and a tab associated with a second category. The item display user interface may display, for example, when a user gesture is a selection gesture selecting one of the tab associated with the first category and the tab associated with the second category, one of items of the first category and items of the second category, and display, when a user gesture is a scroll gesture, both items of the first category and items of the second category.

In accordance with another exemplary embodiment of the present invention, there is provided an item display user interface preferably including: a tab associated with the first category and a tab associated with a second category. The item display user interface may obtain information regarding items of the first category and information regarding items of the second category, and determine the sizes of the tabs associated with the first and second categories on the basis of the obtained information.

In accordance with another exemplary embodiment of the present invention, there is provided an item display user interface preferably including: a tab associated with the first category and a tab associated with a second category. The item display user interface may determine the sizes of the tabs associated with the first and second categories on the basis of information regarding items of the first category and information regarding items of the second category.

BRIEF DESCRIPTION

The exemplary features and advantages of the present invention will become more apparent to a person of ordinary skill in the art from the following detailed description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring appreciation of the subject matter of the present invention by a person of ordinary skill in the art.

The item display apparatus of the present invention preferably displays a tab associated with a first category, a tab associated with a second category, and items of the first category. The item display apparatus also detects a user gesture on or within a predetermined distance from the touch screen. When the user gesture comprises a click on the tab associated with the second category, the item display apparatus removes first category items from the screen and displays second category items only. When the user gesture comprises a scroll action, the item display apparatus displays both first category items and second category items. The item display apparatus may scroll through both first category items and second category items in the scrolling direction.

Figure 1:
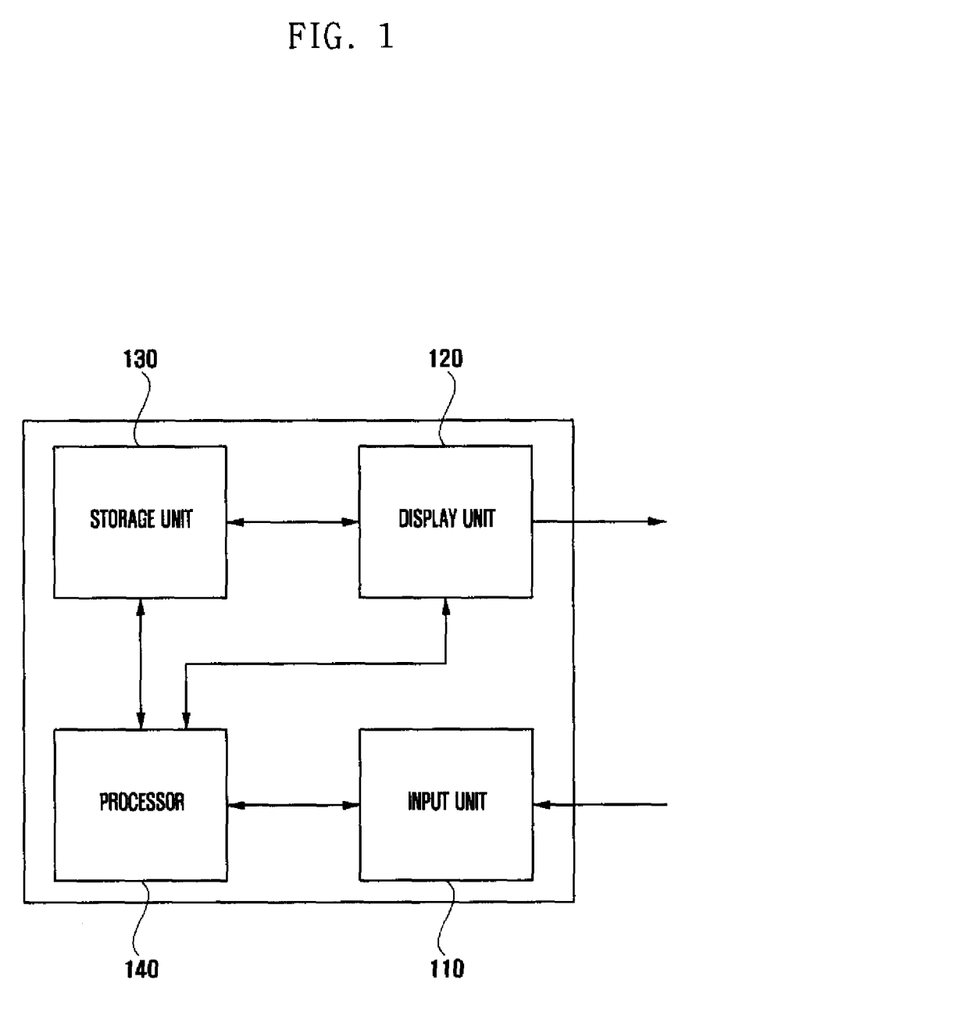
FIG. 1 is a block diagram of an item display apparatus according to an exemplary embodiment of the present invention.

FIG. 1 is a block diagram of an item display apparatus 100 according to an exemplary embodiment of the present invention.

Referring now to FIG. 1, the item display apparatus 100 preferably includes an input unit 110, a display unit 120, a storage unit 130, and a processor 140.

The item display apparatus 100 may be used in various devices such as a mobile portable terminal, a portable multimedia player (PMP), a personal digital assistant (PDA), a smart phone, an MP3 player, a laptop computer, a desktop computer, a table PC, note pad, and a digital TV, just to name a few possibilities of some exemplary various devices. In particular, the item display apparatus 100 is well-suited to devices having a touchscreen.

The input unit 110 generates an input signal corresponding to a sensed user gesture. The input unit 110 may include a touch sensor, a mouse, a joystick and key buttons. The touch sensor may detect user touch and be realized by using a capacitive, resistive, optical including infrared or a pressure sensor to sense user touch. The input unit 110 may generate an input signal carrying information on coordinates of a selection or touch event and a user gesture on the display unit 120 and sends the input signal to the processor 140. User gestures may include user actions such as, for example, click, scroll, flick, drag, swipe, zig-zag, touch-down for contacting the screen, touch-up for releasing contact from the screen, pinch, spread, and two-finger single tap.

The display unit 120 may display information entered by the user or information to be provided to the user. The display unit 120 may have a touchscreen capability. The display unit 120 may be realized using liquid crystal display (LCD) devices, organic light emitting diodes (OLED), active matrix organic light emitting diodes (AMOLED), or a plasma display panel (PDP). Any type of thin-film technology screen can be used.

The display unit 120 may display a screen containing at least one item. When items belong to different categories, the display unit 120 may display the items by category.

The display unit 120 may display an idle screen, menu screen, application screen, and call handling screen. The display unit 120 may provide a plurality of tabs representing associated categories. Tabs are menu items facilitating transition between categories. The user may use tabs to display a new category on the display unit 120 instead of an already displayed category. The display unit 120 may display a tab associated with a new category close to an existing tab. When the number of tabs to be displayed exceeds a preset number, the display unit 120 may reduce sizes of all or some tabs. The display unit 120 may vertically or horizontally arrange multiple tabs in consideration of the height-to-width ratio of the screen.

The display unit 120, according to user gesture, may highlight at least one item on the screen, move a selected item of one category to another category or move at least one item.

The storage unit 130 is a non-transitory machine readable medium that may store programs necessary for operation of the item display apparatus 100 and digital content associated with items. The storage unit 130 may be composed of a volatile memory and a nonvolatile memory. The volatile memory may be a static random access memory (SRAM) or a dynamic random access memory (DRAM). The nonvolatile memory may be a read only memory (ROM), a flash memory or a hard disk, just to name a few possibilities.

The storage unit 130 may include a program area and a content area. The program area may store an operating system (OS) for booting and controlling the item display apparatus 100, application programs for content playback, and other application programs related to image capture or sound playback.

The content area may store content, items associated with content, and information on categories of items or content elements. Content may include images, moving images, phonebooks, audio data, games, broadcasts and text. The content area may store data generated in the course of using the item display apparatus 100.

The processor 140 (i.e. controller) controls overall operations of the components of the item display apparatus 100, and may comprise a microprocessor. For example, the processor 140 may control supply of power to the components for initialization and then control signal exchange between the components for item display.

Hereinafter, exemplary embodiments of the present invention are described in terms of schemes related to "inter-tab screen transitions", "determination of tab sizes" and "bookmarking on tabs". Such schemes may be implemented separately or in combination, and may be modified in various ways in combination with existing mechanisms known to those skilled in the art.

<Inter-Tab Screen Transitions>

In one exemplary embodiment, the processor 140 may display one or both of items of a first category and items of a second category according to a user gesture received by the input unit 110. For example, first category items and tabs associated with the first and second categories may be displayed on the display unit 120. The processor 140 may display items of the first category or second category in response to a selection gesture entered through the display unit 120. Selection gestures may include, for example, a tap on the tab associated with the first or second category. Selection gestures may further include user actions such as click, touch-down and touch-up.

In response to a scroll gesture, the processor 140 may display both items of the first category and items of the second category. The processor 140 may scroll through both first category items and second category items in the scrolling direction. The processor 140 may display first category items first and then display second category items. The processor 140 may display second category items immediately after displaying the last first category item.

Here, scroll gestures may preferably include user actions such as scroll, flick, drag and swipe.

When tabs associated with the first and second categories are closely arranged in the vertical or horizontal direction, a selection gesture may be used to select one of the tabs. A scroll gesture may be applied in a direction corresponding to arrangement of the tabs. For example, when tabs associated with the first and second categories are closely arranged in the vertical direction, a scroll gesture may be applied in a direction identical or similar to the vertical direction. When a first selection gesture for selecting the first category tab and a second selection gesture for selecting the second category tab are made in the vertical direction, a scroll gesture may be applied in a direction identical or similar to the vertical direction. Here, category tabs may be arranged in various directions such as horizontal, vertical, diagonal or circular directions, and two selection gestures for selecting category tabs may be made accordingly.

In response to reception of a user gesture, the processor 140 is preferably configured to determine rankings of multiple categories, select the next ranking category after the first category as the second category, and display both items of the first category and items of the second category. Rankings of the categories may be set in advance or by the user through a corresponding menu. Direction of category transitions based on rankings may be determined according to scrolling directions. For example, when a scroll gesture is made in a downward direction, the second category may be associated with a tab located immediately below the tab associated with the first category; and when a scroll gesture is made in an upward direction, the second category may be associated with a tab located immediately above the tab associated with the first category.

To make a clear distinction between categories, the processor 140 may display items of the first category in a first region and display items of the second category in a second region on the screen. The processor 140 may fill the first region and the second region with different colors. The processor 140 may assign corresponding category names to upper ends of the regions. The processor 140 may highlight a region related to the category having the largest number of items among currently displayed categories.

When the number of category tabs is greater than or equal to a preset number, the processor 140 may display some of the category tabs. In this case, when the user scrolls through a region related to a particular tab or selects the first or last tab, the processor 140 may then display the remaining tabs on the display unit 120.

The processor 140 may control the display to provide an indication regarding the position of a currently displayed item within the first category, on the tab of the first category. The indicated item may act as the reference item for items of the first category. For example, the reference item (indicated item) may be the topmost item or the middle item among currently displayed items of the first category. The processor 140 may make a bar type indication on the tab of the first category to indicate the position of a particular displayed item of the first category. Here, the position of the particular displayed item among all items of the first category may be indicated by the ratio of the distance of the indication (from the beginning of the tab) to the tab length.

Figure 6:
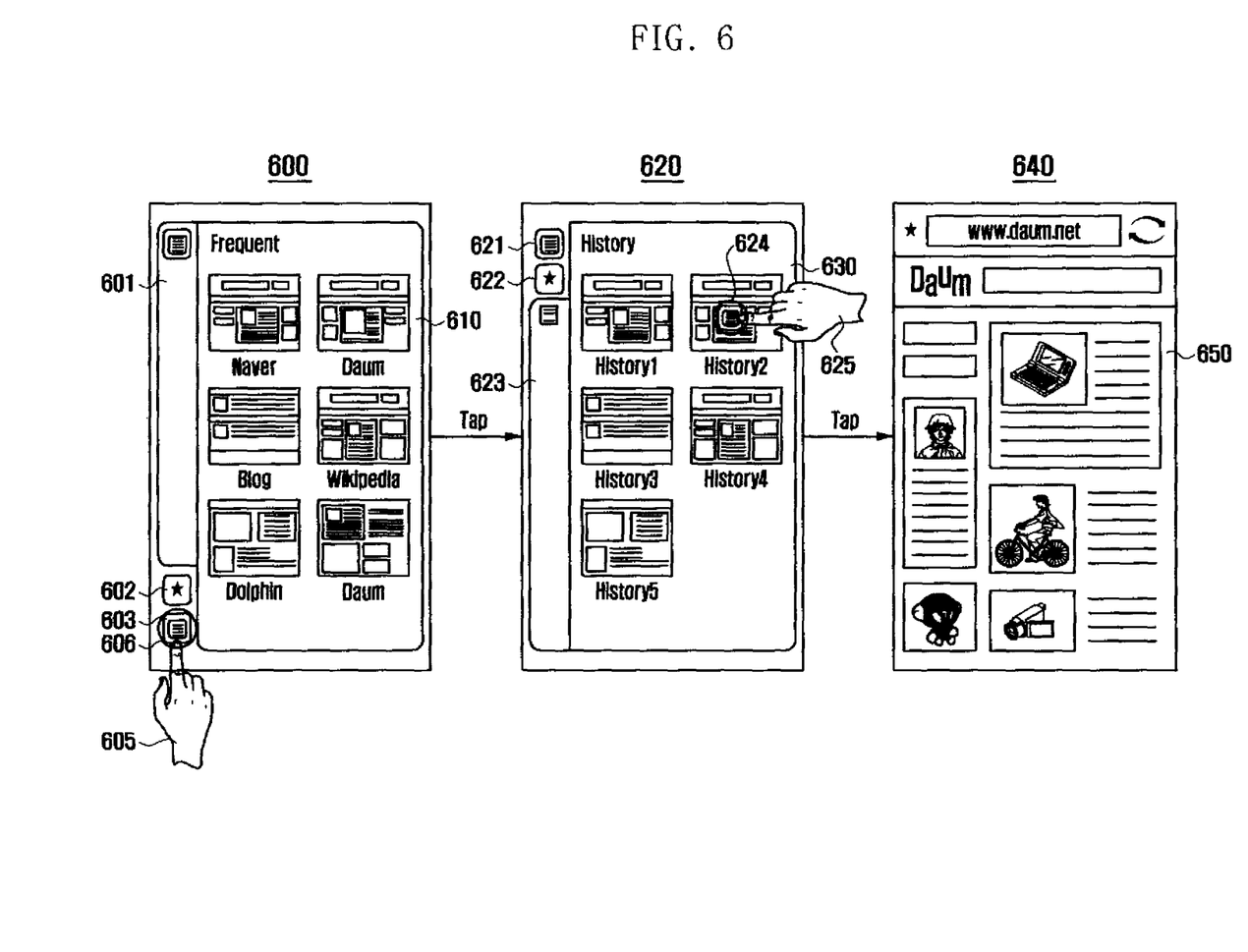
FIG. 6 illustrates exemplary screen representations for item display.

FIG. 6 illustrates some possible examples of screen representations for item display.

In FIG. 6, on screen 600, multiple tabs 601, 602 and 603 and items 610 of a category associated with the activated tab 601 are displayed. The tabs 601, 602 and 603 are arranged in a column along category items. When a desired item is not present among the displayed items 610, the user may make a tap gesture 606 on one of the inactive tabs 602 and 603.

With continued reference to FIG. 6, according to user selection, as indicated by screen 620, the newly selected tab 623 and items 630 of a category associated with the tab 623 are displayed. The previously activated tab 621 is reduced in size and displayed along with the non-selected tab 622. When a desired item is present among the displayed items 630, the user may make a tap gesture 624 on the desired item.

As shown in FIG. 6, according to user selection, as indicated by screen 640, content 650 associated with the selected item is provided to the user.

To display multiple tabs on the display unit 120, the item display apparatus 100 may change arrangement of the tabs on the basis of the height and width of the display unit 120. For example, when the height is greater than the width, the tabs may be displayed in a column vertically on the display unit 120; and when the height is less than the width, the tabs may be displayed in a row horizontally on the display unit 120. With the use of a flexible tab arrangement, the item display apparatus 100 may display as many items as possible on the display unit 120.

Referring again to FIG. 6, when scrolling through items of the "Frequent" category, the user may be unable to view items of the "History" category. That is, to view items of different categories, the user may have to explicitly make a gesture for a category transition. As described herein below, in the present invention, the user may display items of different categories by making scroll gestures without having to make a separate gesture for category transition.

Figure 7:
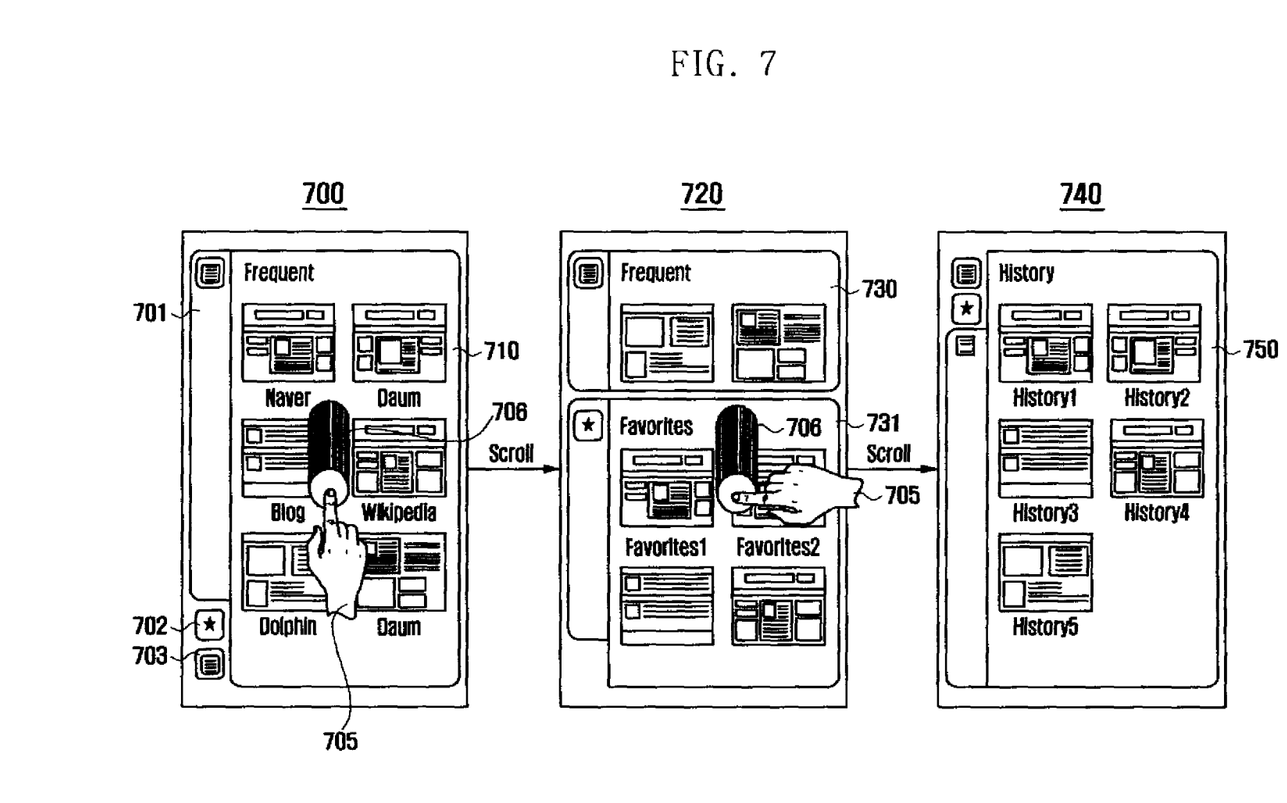
FIG. 7 illustrates exemplary screen representations for item display.

FIG. 7 illustrates exemplary screen representations for item display.

In FIG. 7, as in screen 700, the item display apparatus 100 may display multiple tabs 701, 702 and 703 and items 710 of a category associated with the activated tab 701. The tabs 701, 702 and 703 are arranged in a column vertically along category items. When a desired item is not present among the displayed items 710 or the user wishes to search for items of another category, the user may make a scroll gesture 706 with pointer 705.

When the scroll gesture is in a downward direction, the item display apparatus 100 may display items of the next lower ranking category of the currently displayed category. When the scroll gesture is in an upward direction, the item display apparatus 100 may display items of the next higher ranking category of the currently displayed category. For example, assume that rankings of categories are determined according to arranged locations. When the scroll gesture 706 is in a downward direction, as in screen 720, the item display apparatus 100 may display items 731 of the tab 702 (associated with the next lower ranking category of the currently displayed category) placed below the tab 701 (associated with the currently displayed category). Here, both the items 730 and the items 731 may be displayed together.

Whenever the user makes a scroll gesture, the item display apparatus 100 may display items of the next lower ranking category of the current category while updating the current category. For example, when a scroll gesture 706 is repeatedly made in a downward direction, as in screen 740, the item display apparatus 100 may display items 750 of the last category if the number of downward scrolls exceeds the possible categories that can be displayed by the display apparatus.

As described above, the user may easily transition between categories by making successive scroll gestures without having to select tabs associated with categories. In particular, the user may rapidly perform category traversal by making a scroll gesture for neighboring (relatively nearby) categories and making a selection gesture for relatively distant categories.

Figure 2:
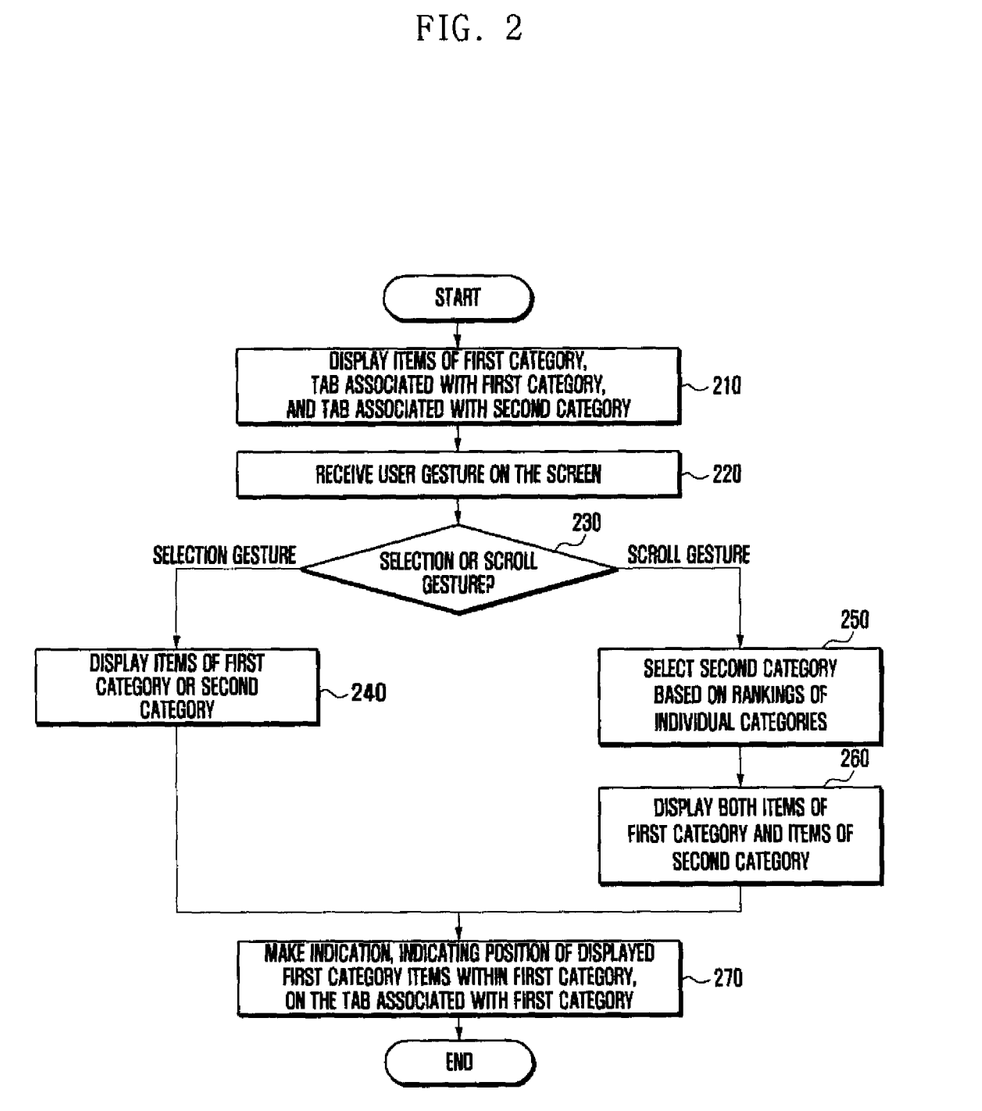
FIG. 2 is a flowchart of an item display method according to another exemplary embodiment of the present invention.

FIG. 2 is a flowchart of an item display method according to another exemplary embodiment of the present invention.

Referring now to FIG. 2, at (210) the item display apparatus 100 displays a tab associated with a first category, a tab associated with a second category and items of the first category on the display unit 120 (shown in FIG. 1). At (220), the item display apparatus 100 receives a user gesture through the display unit 120.

When the user gesture is a selection gesture for selecting one of the first category and second category, at (240) the item display apparatus 100 may selectively display items of the first category or the second category. Here, the selection gesture may correspond to a tap on one of the tabs associated with the first category and second category.

However, when the user gesture is a scroll gesture, then at (260) the item display apparatus 100 may display both items of the first category and items of the second category. For example, the item display apparatus 100 may scroll through both items of the first category and items of the second category in the scrolling direction. Alternatively, the item display apparatus 100 may display items of the first category and then display items of the second category, sequentially displaying each for a predetermined period of time.

When the user gesture is a scroll gesture, the item display apparatus 100 at (250) can select a second category on the basis of the rankings of the individual categories. The item display apparatus 100 may display both items of the first category and items of the second category. The rankings of individual categories may be set in advance or by the user using a corresponding menu. Direction of category transitions based on rankings may be determined according to scrolling directions.

Thereafter, at (270) the item display apparatus 100 may make an indication, which indicates the position of a particular one of the displayed items of the first category within the first category, on the tab associated with the first category. The indicated item may act as the reference item for items of the first category. For example, the reference item may be the topmost item or the middle item among currently displayed items of the first category.

<Determination of Tab Sizes>

In one exemplary embodiment, the item display apparatus 100 may determine the sizes of the tabs associated with the first category and second category on the basis of information on items of the first category and second category, and display the tabs associated with the first category and second category according to the determined sizes.

For example, the processor 140 may identify the number of items in the first category and the number of items in the second category, and determine the size of the tab associated with the first category and the size of the tab associated with the second category in relation to the number of category items. Here, the processor 140 may enlarge the tab having a larger number of category items and reduce the tab having a smaller number of category items within a given range. This exemplary procedure may also be applied to a case where there are many categories. The information on items of a category may include the amount of data related to the items of the category, the number of items having a specific attribute, and others.

When an item is added to or removed from the first category or the second category, the processor 140 may adjust the sizes of the corresponding tabs. For example, when the number of items in the first category increases, the processor 140 may control enlargement of the tab associated with the first category and reduce the tab associated with the second category; and when the number of items in the first category decreases, the processor 140 may control reduction of the tab associated with the first category and enlarge the tab associated with the second category.

In addition, after adjusting the sizes of the tabs associated with the first category and second category using information on category items, the processor 140 may control the display one or both of items of the first category and items of the second category according to the user gesture. For example, when the user makes a selection gesture for selecting one of the first category and second category, the processor 140 may selectively display items of the first category or the second category; and when the user makes a scroll gesture, the processor 140 may display both items of the first category and items of the second category.

After adjusting the sizes of the tabs associated with the first category and second category, the processor 140 may provide an indication regarding the position of a currently displayed item within the first category, on the tab of the first category. Here, the position of the particular displayed item among all items of the first category may be indicated by the ratio of the distance of the indication (from the beginning of the tab) to the tab length.

Figure 8:
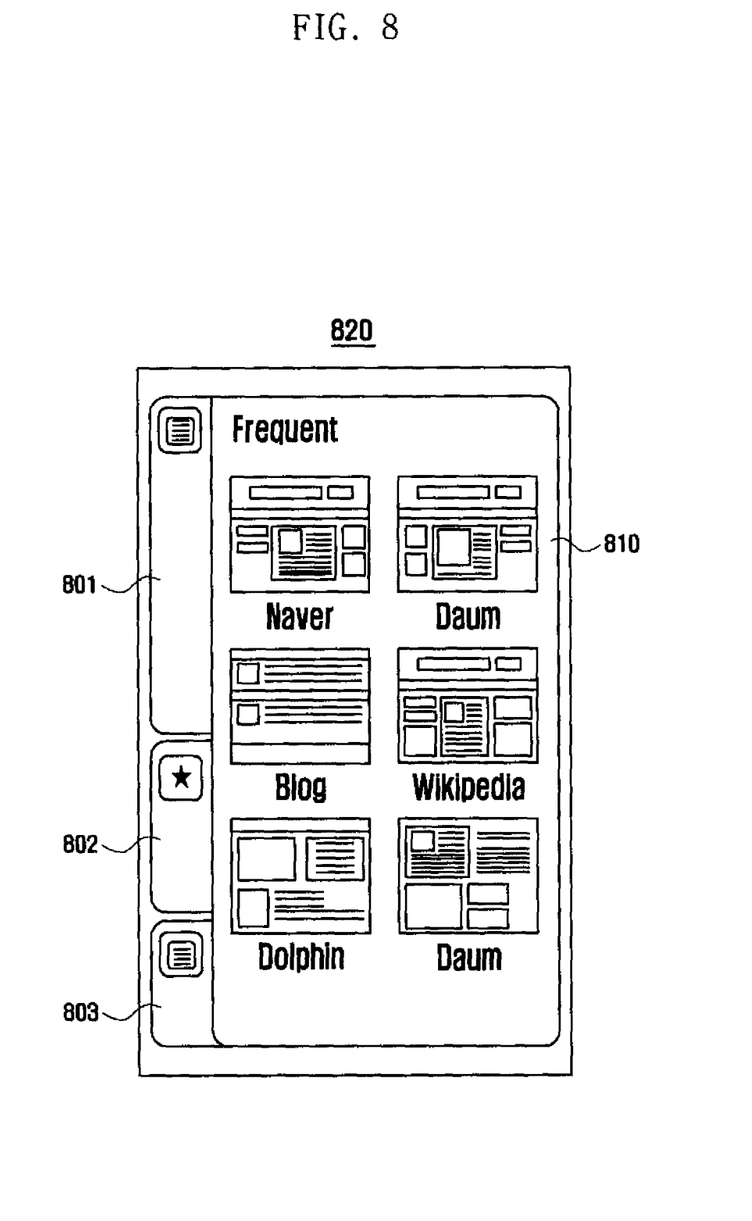
FIG. 8 illustrates an exemplary screen representation for item display.

FIG. 8 illustrates an exemplary screen representation for item display.

Referring now to FIG. 8, as in screen 800, the item display apparatus 100 may display, for example, multiple tabs 801, 802 and 803 and items 810 of a category associated with the activated tab 801. Here, the sizes of the tabs 801, 802 and 803 may be determined according to the number of category items. For example, assume that the category associated with the tab 801 has the largest number of items, the category associated with the tab 802 has the next largest number of items, and the category associated with the tab 803 has the least number of items. Then, as in screen 800, the sizes of the tabs 801, 802 and 803 may be set so that tab 801 is the largest, the tab 802 is second largest, and tab 803 is the smallest.

As described above, when the size of a tab is determined according to the number of category items, the user may estimate the number of items in a category on the basis of the tab size without having to check the category.

Figure 9:
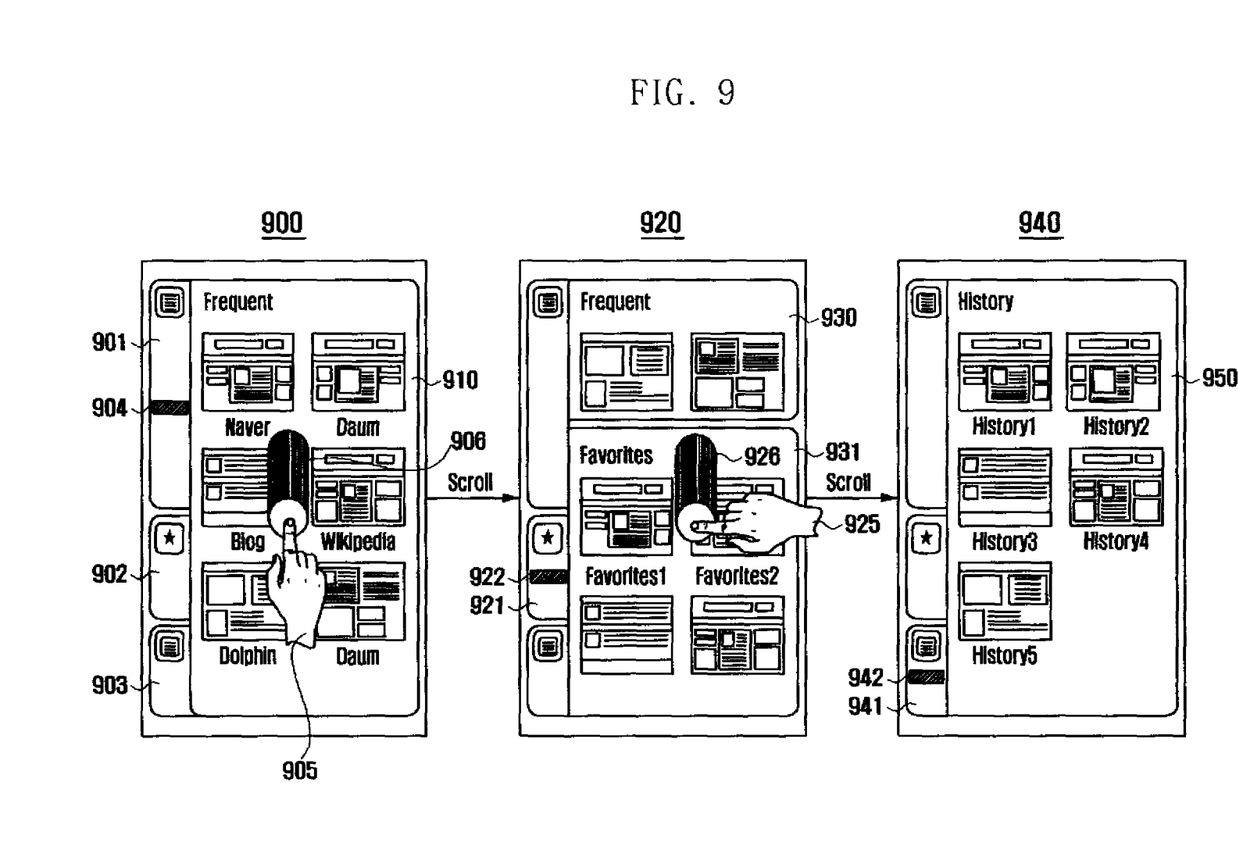
FIG. 9 illustrates exemplary screen representations for item display.

FIG. 9 illustrates more exemplary screen representations for item display.

Referring now to FIG. 9, as shown in screen 900, the item display apparatus 100 may display multiple tabs 901, 902 and 903 and items 910 of a category associated with the activated tab 901. Here, the sizes of the tabs 901, 902 and 903 may be determined according to the number of category items. Screen 900 indicates that the category associated with the tab 901 has the largest number of items, the category associated with the tab 902 has the next largest number of items, and the category associated with the tab 903 has the least number of items.

When a desired item is not present among the displayed items 910 or the user wishes to search for items in another category, the user may make a scroll gesture 906. When the scroll gesture 906 is in a downward direction, as in screen 920, the item display apparatus 100 may display items 931 of the next lower ranking category of the current category. When the scroll gesture 906 is made in an upward direction, the item display apparatus 100 may display items of the next higher ranking category of the current category.

In response to the scroll gesture 906, the item display apparatus 100 may display both items 930 of the current category and items 931 of the next lower ranking category. When a scroll gesture 926 is repeatedly made, as shown in screen 940, the item display apparatus 100 may display items 950 of the last category.

In screen 900, an indication 904, indicating the position of a particular one of the displayed items 910 within the category associated with the tab 901, is displayed on the tab 910. In screen 920, an indication 922, indicating the position of a particular one of the displayed items 931 in the category associated with the tab 921, is displayed on the tab 921. In screen 940, an indication 942, indicating the position of a particular one of the displayed items 950 in the category associated with the tab 941, is displayed on the tab 941. When multiple items of a category are displayed, the topmost one of the multiple displayed items may be the reference item in determining the position of the displayed items within the category.

According to such indication on a tab associated with the current category as described above, the user may readily identify the position of a particular displayed item within the category.

Figure 3:
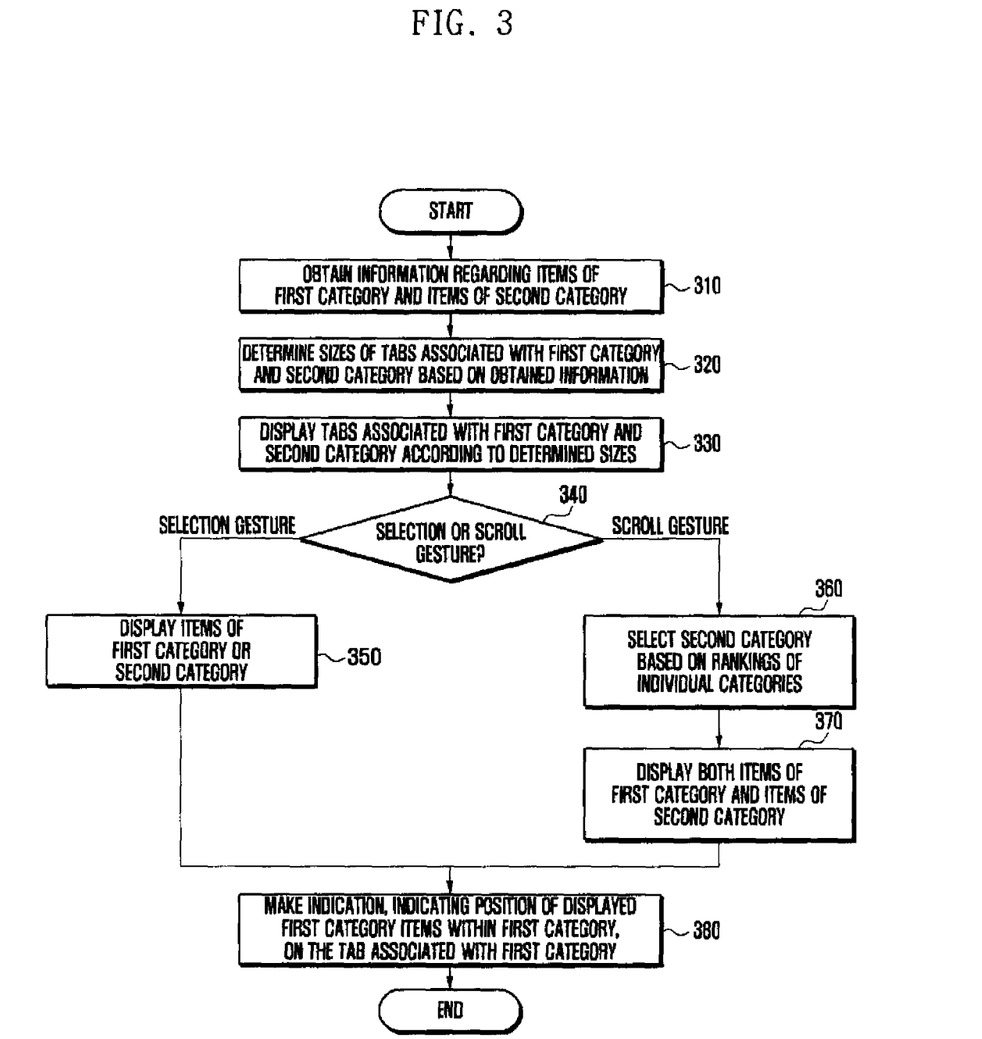
FIG. 3 is a flowchart of an item display method according to still another exemplary embodiment of the present invention.

FIG. 3 is a flowchart of an item display method according to another exemplary embodiment of the present invention.

Referring now to FIG. 3, at (310) the item display apparatus 100 obtains information on items of a first category and a second category. The item display apparatus 100 then at (320) determines the sizes of the tabs associated with the first category and second category on the basis of the obtained information.

At (330), the item display apparatus 100 displays the tabs associated with the first category and second category according to the determined sizes. For example, the item display apparatus 100 may identify the number of items in the first category and the number of items in the second category, and determine the size of the tab associated with the first category and the size of the tab associated with the second category in relation to the number of category items. Here, the item display apparatus 100 may enlarge the tab having a larger number of category items and reduce the tab having a smaller number of category items within a given range.

After determining the sizes of the tabs associated with the first category and second category using information on category items, the item display apparatus 100 may display one or both of items of the first category and items of the second category according to user gesture.

Specifically, at (340) the item display apparatus 100 receives a user gesture through the display unit 120. When the user gesture is a selection gesture for selecting one of the first category and second category, then at (350) the item display apparatus 100 may selectively display items of the first category or the second category.

When the user gesture is a scroll gesture, then at (360) the item display apparatus 100 may select a second category on the basis of the rankings of the individual categories, and at (370) may display both items of the first category and items of the second category.

Thereafter, at (380), the item display apparatus 100 may make an indication, which indicates the position of a particular one of the displayed items of the first category within the first category, on the tab associated with the first category.

<Bookmarking On Tabs>

In one exemplary embodiment, the item display apparatus 100 may display information regarding at least one item of the first category on the tab associated with the first category. For example, when items of the first category and the tab associated with the first category are displayed on the display unit 120, the input unit 110 may send a user gesture for selecting at least one item of the first category to the processor 140. The processor 140 may process information regarding the selected item to display the processed information on the tab associated with the first category. Here, information on a selected item of the first category may be at least one of position information of the selected item and a thumbnail thereof. Position information may indicate the position of the selected item within the corresponding category. Such information may be displayed as an indication or a bookmark. Here, the position of the selected item among all items of a category may be indicated by the ratio of the distance of the indication (from the beginning of the tab) to the tab length.

After displaying item information on the corresponding tab, the input unit 110 receives a user gesture selecting the item information and sends the user gesture to the processor 140. The processor 140 may is display additional information related to the selected item information. For example, when the selected item is a name of a person, the processor 140 may control the display of additional information related to the person such as place of employment, sex, photograph, e-mail address, phone number, text message or recent call log as a popup window.

A user gesture for selecting an item of the first category may be started from the item region and be ended at the tab region on the screen. Such a user gesture may be a flick action or a drag action. When movement speed of a user gesture beginning from a first region and ending at a second region is greater than a threshold value, the user gesture may be considered as flick. When movement speed of a user gesture beginning from a first region and ending at a second region is less than the threshold value, the user gesture may be considered as drag.

When information regarding multiple items is displayed on the tab associated with the first category, the processor 140 may display additional information related to one of the multiple items on the basis of the distance between information elements of the multiple items. Specifically, when information elements of multiple items are densely arranged on the tab, it may be difficult for the user to select a desired information element of an item. To handle such a case, when a user gesture simultaneously selecting multiple information elements is entered through the input unit 110, the processor 140 may determine whether the distance between the selected information elements is less than a preset value, and display a menu or popup window to enable the user to select a desired information element on the basis of the determination result.

The processor 140 may display a selected one of items of the first category. For example, when one of the information elements displayed on the tab associated with the first category is selected, the processor 140 may display the selected item on the display unit 120 according to user input. Here, the processor 140 may display only a particular item indicated by the selected information element on the corresponding tab, or display all items indicated by the selected information elements on the corresponding tab.

When information regarding multiple items is displayed on the tab associated with the first category, the processor 140 may display one or both of the items of the first category and items of the second category according to user gesture. When a received user gesture is a selection gesture for selecting one of the first category and second category, the processor 140 may selectively display items of the first category or the second category. When a received user gesture is a scroll gesture, the processor 140 may display both items of the first category and items of the second category.

Figure 10:
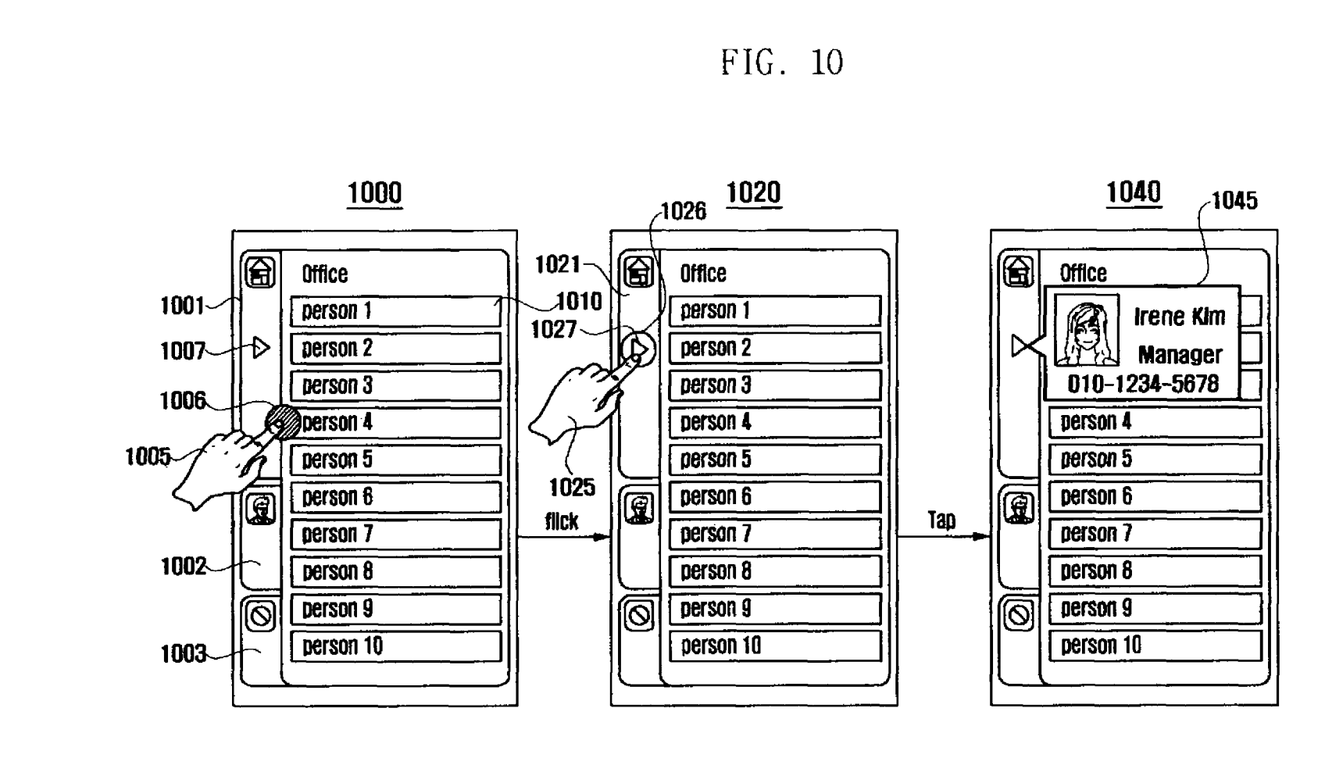
FIG. 10 illustrates exemplary screen representations for item display.

FIG. 10 illustrates exemplary screen representations for item display.

Referring now to FIG. 10, as shown in screen 1000, the item display apparatus 100 may display multiple tabs 1001, 1002 and 1003 and items 1010 of a category associated with the activated tab 1001. When the user makes a flick gesture 1006 to select at least one of the displayed items 1010, the item display apparatus 100 may display information 1007 regarding the selected item on the activated tab 1001 as in screen 1020. Here, the information 1007 may indicate the position of the selected item within the corresponding category. In screen 1020, the position of the selected item among all items of the corresponding category may be indicated by the relative position of the information 1027 (from the beginning of the tab 1021) on the tab 1021.

When the item information 1027 is displayed on the tab 1021 in response to the flick gesture 1006, the user may select the item information 1027 on the tab 1021 using a tap gesture 1026. In response, as in screen 1040, the item display apparatus 100 may display additional information regarding the selected item using a popup window 1045.

For example, when information on the selected item is the name of a person, additional information may be related to a display of a photograph, such as a place of work, phone number, and e-mail address of the person.

As described above, thanks to bookmarks on tabs, the user may readily identify the number of bookmarked items of a specific category. The user may easily view additional information on a bookmarked item by selecting the bookmarked item through the corresponding tab without having to perform category traversal.

Figure 11:
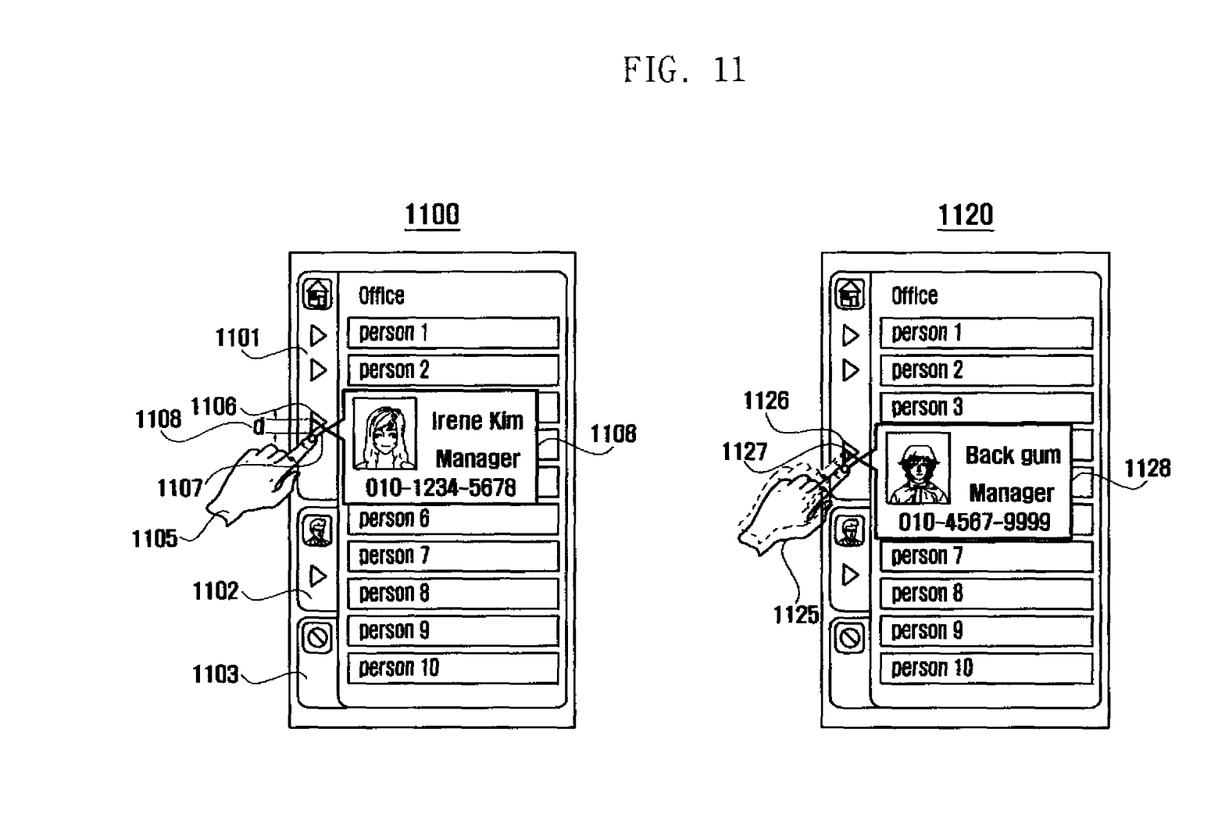
FIG. 11 illustrates exemplary screen representations for item display.

FIG. 11 illustrates more exemplary screen representations for item display.

In FIG. 11, as in screen 1100, the item display apparatus 100 may display multiple tabs 1101, 1102 and 1103 and items 1110 of a category associated with the activated tab 1101. Here, each of the tabs 1101, 1102 and 1103 includes an information element of at least one bookmarked item.

To view additional item information, the user may select one of the information elements on the tab 1101. As in screen 1100, when the distance (d, 1108) between information elements is very small, it may be difficult for the user to correctly select a desired information element (or item). In this case, the user may make a touch-down and move gesture (touch and move while maintaining contact) for correct selection.

With continued reference to FIG. 11, for example, as in screen 1100, when the user makes a touch-down gesture to select an information element 1106 among information elements 1106 and 1107, additional information 1108 of an item corresponding to the touch point may be displayed regardless of the user's intention.

As shown in screen 1120, while maintaining contact with the information element 1126, the user may move to the information element 1127. As a result, the additional information 1108 corresponding to the initial touch point disappears, and additional information 1128 of an item corresponding to the last touch point is displayed.

Figure 4:
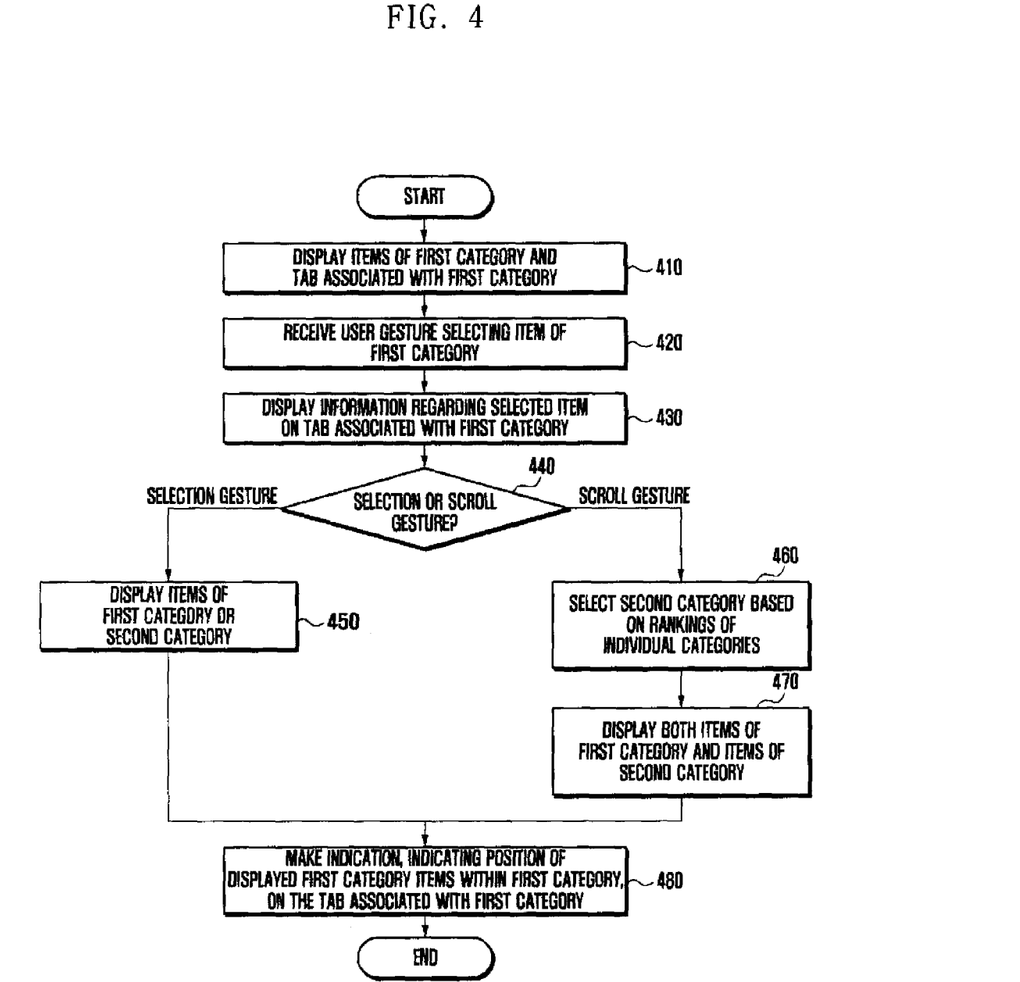
FIG. 4 is a flowchart of an item display method according to yet another exemplary embodiment of the present invention.

FIG. 4 is a flowchart of an item display method according to another exemplary embodiment of the present invention.

Referring now to FIG. 4, at (410) the item display apparatus 100 displays items of the first category and a tab associated with the first category on the display unit 120. At (420) the item display apparatus 100 receives a user gesture for selecting at least one item of the first category. At (430) the item display apparatus 100 displays information regarding the selected item on the tab associated with the first category. Here, the item information may be one or both of position information and a thumbnail of the selected item. Position information may indicate the position of the selected item within the corresponding category. Such information may be displayed as an indication or a bookmark.

After displaying item information on the tab associated with the first category, the item display apparatus 100 may display one or both of items of the first category and items of the second category according to user gesture.

Specifically, at (440) the item display apparatus 100 receives a user gesture through the display unit 120. When the user gesture is a selection gesture for selecting one of the first category and second category, then at (450) the item display apparatus 100 may selectively display items of the first category or the second category.

However, when the user gesture is a scroll gesture, and at (460) the item display apparatus 100 may select a second category on the basis of the rankings of the individual categories, and at (470) may display both items of the first category and items of the second category.

Thereafter, at (480) the item display apparatus 100 may make an indication, which indicates the position of a particular one of the displayed items of the first category within the first category, on the tab associated with the first category.

Figure 5:
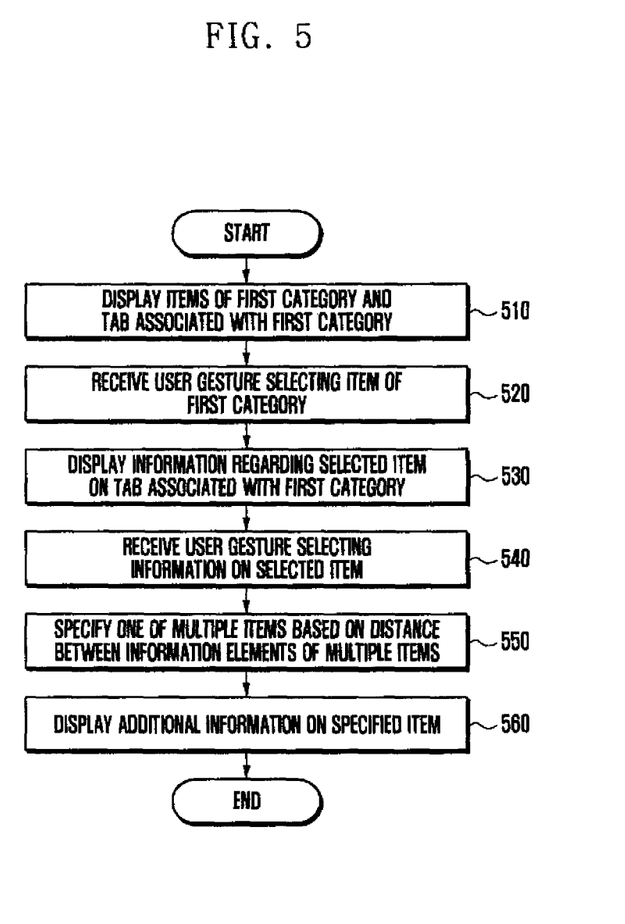
FIG. 5 is a flowchart of an item display method according to even another exemplary embodiment of the present invention.

FIG. 5 is a flowchart of an item display method according to another exemplary embodiment of the present invention.

Referring now to FIG. 5, at (510), the item display apparatus 100 displays items of a first category and a tab associated with the first category on the display unit 120. At (520), the item display apparatus 100 receives a user gesture for selecting at least one item of the first category. The item display apparatus 100 at (530) displays information regarding the selected item on the tab associated with the first category.

At (540), the item display apparatus 100 receives a user gesture selecting item information on the tab. At (560), the item display apparatus 100 displays additional information related to the selected item information.

However, at (550), when the user selects item information on the tab, the item display apparatus 100 may select one of multiple items on the basis of the distance between information elements of the multiple items. Specifically, when information elements of multiple items are densely arranged on the tab, it may be difficult for the user to select a desired information element of an item. To handle such a case, when a user gesture simultaneously for selecting multiple information elements is entered through the input unit 110, the item display apparatus 100 may determine whether or not the distance between the selected information elements is less than a preset value, and display a menu or popup window to enable the user to select a desired information element on the basis of the determination result.

The above-described methods according to the present invention can be realized in hardware, firmware or as software or computer code that can be stored in a non-transitory recording medium such as a CD ROM, a RAM, thumbnail drive, a floppy disk, a flash storage, a hard disk, or a magneto-optical disk, etc., or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The methods of the present invention may be implemented as computer programs and may be stored in various computer readable storage media. The computer readable storage media may store program instructions, data files, data structures and combinations thereof. The program instructions may include instructions developed specifically for the present invention and existing general-purpose instructions. The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims. For example, there can be more than two categories, and the tabs can be displayed in columns, rows, on opposite sides or top and/or bottom of the display, just to name a few possibilities.

What is claimed is:

1. An item display method comprising:
    displaying items of a first category on a display unit, and displaying a tab associated with the first category and a tab associated with a second category on a screen of the display unit;
        receiving by a processor a user gesture on the screen detected by an input unit;
        displaying by the display unit, when the processor determines that the user gesture comprises a selection gesture selecting one of the tab associated with the first category or the tab associated with the second category, one or more of items of the first category and items of the second category;
        displaying by the display unit, when the processor determines that the user gesture comprises a scroll gesture in a vertical or horizontal direction relative to a screen of the display unit, items of the second category immediately subsequent to displaying a last item of the first category;
        receiving by the processor a second user gesture detected by the input unit for selecting at least one item of the first category, wherein the second user gesture begins at a region of the display in which the item of the first category is displayed and ends at a region of the display in which the tab associated with the first category is displayed; and
        displaying information regarding the selected item on the tab associated with the first category.

2. An item display method comprising:
    displaying items of a first category on a display unit, and displaying a tab associated with the first category and a tab associated with a second category on a screen of the display unit;
        receiving by a processor a user gesture on the screen detected by an input unit;
        displaying by the display unit, when the processor determines that the user gesture comprises a selection gesture selecting one of the tab associated with the first category or the tab associated with the second category, one or more of items of the first category and items of the second category;
        displaying by the display unit, when the processor determines that the user gesture comprises a scroll gesture in a vertical or horizontal direction relative to a screen of the display unit, items of the second category immediately subsequent to displaying a last item of the first category;
        receiving by the processor a second user gesture detected by the input unit for selecting at least one item of the first category;
        displaying information regarding the selected item on the tab associated with the first category;
        receiving by the processor a third user gesture detected by the input unit selecting item information on the tab associated with the first category; and
        displaying additional information related to the selected item information.

3. An item display method comprising:
    displaying items of a first category on a display unit, and displaying a tab associated with the first category and a tab associated with a second category on a screen of the display unit;
        receiving by a processor a user gesture on the screen detected by an input unit;
        displaying by the display unit, when the processor determines that the user gesture comprises a selection gesture selecting one of the tab associated with the first category or the tab associated with the second category, one or more of items of the first category and items of the second category;
        displaying by the display unit, when the processor determines that the user gesture comprises a scroll gesture in a vertical or horizontal direction relative to a screen of the display unit, items of the second category immediately subsequent to displaying a last item of the first category;
        receiving by the processor a second user gesture detected by the input unit for selecting at least one item of the first category;
        displaying information regarding the selected item on the tab associated with the first category; and
        displaying, when information elements of multiple items are displayed on the tab associated with the first category, additional information related to one of the multiple items on the basis of a distance between information elements of the multiple elements.

* * * * *